United States Patent [19]

Winyall et al.

[11] 3,959,174

[45] May 25, 1976

[54] METHOD OF SELECTIVELY PRODUCING HIGH PORE VOLUME SILICA GEL

[75] Inventors: Milton E. Winyall, Ellicott City; Ellsworth G. Acker, Baltimore, both of Md.

[73] Assignee: W. R. Grace & Co., New York, N.Y.

[22] Filed: Jan. 10, 1973

[21] Appl. No.: 322,570

Related U.S. Application Data

[63] Continuation-in-part of Ser. No. 174,524, Aug. 24, 1971, abandoned, which is a continuation-in-part of Ser. No. 71,966, Sept. 14, 1970, abandoned.

[52] U.S. Cl.................................. 252/317; 252/28; 423/338
[51] Int. Cl.$^2$.................. B01J 13/00; C01B 33/14; C01B 33/16
[58] Field of Search ............ 252/317; 423/338, 339

[56] References Cited
UNITED STATES PATENTS

| | | | |
|---|---|---|---|
| 2,477,695 | 8/1949 | Kimberlin, Jr................. | 252/317 X |
| 2,625,492 | 1/1953 | Young............................ | 252/317 X |
| 3,243,262 | 3/1966 | Carr et al....................... | 252/451 X |
| 3,301,701 | 1/1967 | Baker et al. ................... | 117/118 |

*Primary Examiner*—Richard D. Lovering
*Attorney, Agent, or Firm*—Giedre M. McCandless

[57] ABSTRACT

High pore volume silica materials are useful as thickening, reinforcing and flatting agents. This invention comprises selectively forming silica gels having pore volumes in the range of 1.2 to 3.0 cc/g. These high pore volume silica gels can be produced by the alkaline gelation of a mixture of silicate and ammonium hydroxide at a pH of from 10.6 to 11.2, using a water soluble silica desolubilizing agent selected from the group consisting of ammonia, monohydric alcohols, glycols, ketones and salts. The silica is then aged, neutralized, optionally aged a second time, filtered and washed. This silica may then be dried and directly used, or it may be milled to a smaller size. For use as a thickening agent, the silica is milled in a fluid energy mill to an average particle size of less than about 1 micron, and preferably to less than 0.5 micron.

25 Claims, No Drawings

1

METHOD OF SELECTIVELY PRODUCING HIGH PORE VOLUME SILICA GEL

BACKGROUND OF THE INVENTION

This application is a continuation-in-part of U.S. application Ser. No. 174,524, filed Aug. 24, 1971 now abandoned, which in turn in a continuation-in-part of U.S. application Ser. No. 71,966, filed Sept. 14, 1970 now abandoned.

This invention relates to direct gelation processes for producing high pore volume silica selectively within the range of 1.2 to 3.0 cc/g. This invention further relates to an alkaline gelation technique whereby by a selection of parameters the pore volume of a product silica can be predetermined with high accuracy. And in a further mode, this invention relates to the use of these high pore volume silica products as thickening, reinforcing or flatting agents.

Silica is a very useful material. It is used for flatting varnishes, paints and similar coatings, for thickening oils, and also as a reinforcing agent, particularly in rubber formulation. Generally, the end use will determine the characteristics the silica should have, and this in turn determines the mode of synthesis. For instance, for thickening applications the silica should be of a small average particle size, that is of 1 micron or less; while when used as a flatting agent, the silica should have an average particle size in the range of 1 to 20 microns. The ideal situation is to have one general method of synthesis by which these and other silica gels can be produced. The present invention to a high degree accomplishes this. This process produces a silica gel having a pore volume which can be set at any value about 1.2 to 3.0 cc/g by a known adjustment of reaction parameters. Therefore if a thickening grade silica gel is necessary, a silica gel of a pore volume of 2.2–3.0 cc/g can be produced and this product then deaggregated in a fluid energy mill. The higher pore volume silica gels are more fragile and can be readily attrited to particle sizes of less than 0.5 micron in a fluid energy mill. If a flatting gel is desired, then a lower pore volume gel can be produced, that is, from about 1.2 to 2.5 cc/g, and this silica gel used directly or agglomerated and milled, which will produce a more uniform material.

In essence, this invention allows those in the art to selectively produce a desired silica gel. This is accomplished by careful control of reactant concentrations, and the use of an alkaline gelation technique. Further, the process includes the necessary use of a material which decreases the solubility of silica at an alkaline pH. By the careful control of these concentrations and the gelation pH, the silica product can be tailored to the required specifications.

It is further an object of this invention by a process of known reactant concentration ratios and pH to tailor a silica gel to a specific pore volume within the range of 1.2 to 3.0 cc/g.

It is also an object of this invention to produce silica gels of defined characteristics for uses either as thickening agents, reinforcing agents or flatting agents.

BRIEF SUMMARY OF THE INVENTION

This invention comprises a process for selectively producing a silica having a specific pore volume within the range of 1.2 to 3.0 cc/g using alkaline gelation, by the control of silicate concentration, the use of a desolubilizing substance such as ammonium hydroxide, sodium sulfate or other such salt to decrease the solubility of silica, and the concentration ratio of this desolubilizing agent to silica content. The silica concentration is maintained at 3 to 15 percent, the silica to desolubilizing agent ratio at 2 to 20 and the gelation pH at 10.6 to 11.2. The gelled silica is then aged, neutralized, filtered, optionally aged a second time and washed. Further process steps are then determined by the specific contemplated use. This silica gel may be dried and directly used, agglomerated by drying and milled in a fluid energy mill, or milled and dried simultaneously in a fluid energy mill.

DETAILED DESCRIPTION OF THE INVENTION

Broadly, the present invention provides a unique method for reproducibly preparing a wide pore volume range of silica gels. By this unique method, silica gel having a pore volume anywhere in the range from about 1.2 cc/g up to 3.0 cc/g can be tailormade for any defined product use. The ability to produce silica gels to defined pore volume characteristics, utilizing a single general process technique, is a singular achievement in the art. Further, the process does not require expensive equipment or reagents, or long time periods. Additionally, once having achieved these distinct pore volumes the silica may be ground using a fluid energy mill or other suitable equipment to average particle sizes of less than one micron. Such ground silica gels of high pore volume and average particle size of less than .5 micron are efficient thickening agents. Silica materials of a high pore volume and an avergae particle size in the range of 1 to 20 microns may also be produced by the process of this invention and are useful flatting agents.

The process of the present invention comprises an alkaline gelation technique with closely adjusted concentrations of silicate and silicate to silica desolubilizing agent ratios, pH ranges and temperature ranges. By such close control of the process parameters, distinctive characteristic silica products can be produced. This process essentially consists of forming an alkali metal silicate solution wherein the silicate is in a concentration of about 3 to 15 percent, calculated as the $SiO_2$ content. A silica desolubilizing agent is added to this solution so as to produce an $SiO_2$ to desolubilizing agent ratio of about 2 to 20. This solution may be allowed to stand (age) for about 0.25 to 30 minutes, or it may be immediately utilized in the subsequent step of the process. In the subsequent step, the pH is adjusted in about 11.2 to 10.6, depending upon silica concentration and silica/desolubilizing agent ratio, in order to form a silica hydrosol. The silica hydrosol on standing sets to a silica hydrogel. This gelled silica is then aged from about 2 minutes to 120 minutes. This aging should be with agitation, or may consist of a period of up to about 15 minutes without agitation, followed by agitation during the remainder of the aging period. This aging may be conducted at 20° to 95°C. The pH is then further adjusted to about 10 to 3 to neutralize any remaining sodium ions in the silica, followed by an optional aging at 20°C to 95°C for 0.1 to 24 hours before washing and filtering. This silica material is then in a slurry form simultaneously dried and deaggregated in a fluid energy mill to the desired particle size. The silica product may also be used directly after filtering with or without a drying.

Any of the soluble alkali metal silicates may be used in this process. These include the silicates and metasilicates of sodium and potassium. The desolubilizing agent which is added serves various functions. The prime function is to make water a more insoluble solvent for silica, and particularly when carbon dioxide is used to form the silica hydrosol. The desolubilizing agent, by making the water a more insoluble media for silica causes a silica hydrosol to form a gel at a higher pH. It is important that the alkali silicate solution be converted to a silica hydrosol at a pH of about 10.6 or higher, and that the silica hydrosol convert to a silica hydrogel at this pH range. This is a necessary requirement for producing these silica gels. The silica primary particles, micelles, which form at this pH and in the presence of such an agent are less reactive with their neighbors, thus decreasing tight clustering and creating larger pore volumes.

Ammonia and sodium sulfate are preferred desolubilizing agents, although any substance which is soluble in water, does not decrease the pH to less than 10.6 and which decreases the solubility of silica in water can be used. Useful agents which create this insolubility (desolubilizing) and which may be used in place of the preferred substances, include the alcohols such as methanol, ethanol, propanols and glycols, ketones such as acetone and methyl ethyl ketone, and salts such as ammonium sulfate, ammonium chloride, potassium sulfate, potassium chloride, calcium chloride and sodium chloride, Agents which raise pH, and which can be added in conjunction with the above insolubilizing agents, include the alkali ammonium salts of weak acids such as ammonium carbonate.

In the gelation step, an acid is added to lower the pH to the range of 11.2 to 10.6 to form a silica hydrosol. Any suitable acid may be used such as phosphoric acid, sulfurous acid, hydrochloric acid, sulfuric acid, nitric acid or nitrogen oxides, with sulfuric acid or carbon dioxide being preferred. Carbon dioxide in aqueous solution forms a carbonic acid. In the pH range of 11.2 to 10.6, the silicate/desolubilizing agent solution forms a silica hydrosol which then gels on standing with no further acid addition to form a silica hydrogel. The time period for the silica hydrosol to automatically convert to a silica hydrogel is known as the set time. This time period is in the range of about 0.5 to 15 minutes. Silica hydrosol primary particles grow (polymerize) during this period to the larger aggregate silica hydrogel particles. The silica hydrosol is preferably not mixed during this set time period. The final pH after completion of this acid addition is above 10.6. Gelation is usually carried out at ambient temperatures, although higher temperatures can be used. Generally higher temperatures reduce surface area and increase the average pore diameter. The mixture may be agitated after gelation. When agitation is used, the gelled silica will be in a slurry form. Overlap gelation has been found to be undesirable, that is, when fresh hydrosol is run in on an already set silica slurry to form a continuous process. A protective colloid such as gelatin or casein may be present during gelation, but this is not necessary. During gelation the pH of the mixture will decrease about 0.1 to 0.6 pH units.

After gelation, the silica hydrogel is aged for 2 minutes to 2 hours, and preferably from 40 to 120 minutes. The silica hydrogel should be agitated during all or most of the aging period. Any non-agitated aging period should preferably not exceed 15 minutes. This time period of aging will in part be governed by the gelation set time. One purpose of aging is to control the surface area of the final silica product. The temperature of the aging mixture should be maintained between 15 C to 95°C.

The following step consists of acid neutralization of alkali ions remaining in the silica hydrogel. The pH is adjusted to about 10 to 3. A preferred pH is about 9 to 9.7 for carbon dioxide neutralization, and a pH as low as 3 for sulfuric acid or other mineral acid neutralization. When the neutralizing acid is added at a slow rate, a portion of the neutralizing time will be considered to be also a part of the aging time period.

Generally, sulfuric acid or carbon dioxide is used for this neutralization, but other acids may be used. Suitable other acids which may be used are hydrochloric acid, phosphoric acid, sulfurous acid, nitric acid, as well as organic acids. Further, various gaseous acid anhydrides such as sulfur oxides and nitrogen oxides which form acids in aqueous solutions may be used. After neutralization, the silica hydrogel may be aged or directly filtered and washed. This wash may be a straight water or an acidified water wash.

As set out above, essentially any pore volume silica from about 1.2 cc/g to 3.0 cc/g can be reproducibly made using the process of this invention. It is only necessary to adjust the silicate concentration (percent $SiO_2$) and the $SiO_2$ to desolubilizing agent ratio to the correct values. The number array within Table I have been carbon dioxide gelled. The results are similar when the alkali silicate is sulfuric acid gelled.

Table I

| | | $SiO_2/NH_3/RATIO$ | | | | |
|---|---|---|---|---|---|---|
| | | 2 | 3 | 4 | 6 | 12 |
| SILICATE CONCEN- TRATION PERCENT $SiO_2$ | 5 | 1.3 | — | — | 1.1 | — |
| | 6 | 1.6 | 1.5 | 1.3 | — | — |
| | 6.75 | 2.6 | 2.0 | 1.3 | — | — |
| | 7 | 2.7 | 2.7 | 2.6 | — | — |
| | 7.5 | 2.6 | 2.8 | 2.3 | — | — |
| | 8 | — | 2.7 | 2.7 | 2.5 | — |
| | 9 | 1.5 | 2.5 | 2.7 | 2.7 | 2.5 |
| | 10 | — | — | — | 2.6 | 2.6 |
| | 11 | — | — | 1.6 | 2.3 | 2.6 |
| | 11.5 | — | — | — | — | 2.4 |
| | 12 | — | — | — | — | 2.2 |
| | 13 | — | — | — | 1.2 | 1.4 |

From this table, it is evident that there are many concentration permutations which may be used to produce a silica with a designated pore volume. Very useful thickening grade silicas are produced using a silica concentration of 6 percent $SiO_2$ and an $SiO_2/NH_3$ ratio of 3. For flatting grade silicas, the perferred values are 10 percent $SiO_2$ and an $SiO_2/NH_3$ ratio of 6.

The washed silica materials of this invention as formed generally vary in particle size, depending to a large degree on whether agitation is utilized during gelation. When there is no agitation during gelation, the particles formed will be in a large agglomerated size of 100 microns or more.

In a further preferred embodiment of this invention, the product silica gels having a pore volume of 2.0 to 3.0 cc/g are reslurried after the filtering step, without any intermediate drying, and simultaneously dried and deaggregated to a particle size of 0.5 micron or less in a fluid energy mill. At this state, these may be designated hydrogels which usually contain 50-80 percent by weight water. The feed to the mill is usually a slurry and has a concentration of up to about 20 percent silica with the remainder being water. It is preferred to use a fluid energy mill of the micronizer or jet pulverizer type with a high temperature, high pressure feed gas. In this fluid energy mill, the grinding is supplied by multiple particle contacts. Each contact abrades the particles. U.S. Pat. No. 3,186,648 describes a typical jet pulverizer. This mill may be operated using essentially any high temperature and high pressure gas such as air, nitrogen, steam and so on. In producing silica gel particles of 0.5 micron or less, it is preferred to use air at a temperature of about 400°–1000°F and pressure of 80–250 psi. When the product is at a particle size of about 0.5 micron or less, it exits from the mill and is collected. This product is dry, but may be further dried using any conventional technique such as flash drying, oven drying, spray drying or air drying. This silica of an average particle size of less than 0.5 micron is very useful as a thickening agent for oils, polyesters and other similar materials.

In a second preferred embodiment, after washing and filtering and prior to reslurrying, the silica is dried. This may be oven drying or spray drying. This drying forms particle agglomerates of greater than 20 microns. The agglomerated silica is fed into a fluid energy mill, preferable of the micronizer or jet pulverizer type. When the particles are at a predetermined size within the range of about 1 to 20 microns, they exit from the mill and are collected. A preferred average particle size range is from 1 to 20 microns with such silica products being very useful flatting agents.

Generally, silica which is to be used as a thickening agent will be of a smaller particle size than silica to be used as a flatting agent. For this reason, in the above process, when the silica is destined for use as a flatting agent the silica is preferably dried prior to fluid energy milled, although this is not absolutely necessary. By drying prior to milling, the silica agglomerates into larger particles which can more readily be tailored to a desired particle size in the range of 1 to 20 microns. However, in instances where there is no agitation during gelation and the silica after washing is already in an agglomerated condition, a drying to agglomerate is not required, and the washed silica may be fed directly to the fluid energy mill. For thickening applications of the silica, there is preferably no drying step prior to feeding to the fluid energy mill.

In either use, that is either as a thickening agent or as a flatting agent, the amount of silica having the required characteristics is worked into the material which it is to thicken or flat by any of the standard known techniques. The following examples aid in explaining, but should not be deemed as limiting, the instant invention. In all cases, unless otherwise noted, all parts and percentages are by weight.

EXAMPLE 1

This example sets out a procedure for producing a thickening silica using $H_2SO_4$ gelation.

An acid solution of 300 gm. $H_2SO_4$ in 1000 ml of $H_2O$ (may contain 10 gm. gelatin) was poured with mixing into a silicate solution which was made up from 2500 ml. sodium silicate (28 percent $SiO_2$ and 8.7 percent $Na_2O$), 3250 ml. $H_2O$ and 1750 ml. of 30 percent aqueous ammonium hydroxide. The pH of the resulting silica hydrosol was 10.95. The set time was about 6 minutes. An $H_2SO_4$ solution was then added slowly, producing a slurry of pH 10.4, with full neutralization at about pH 10. This slurry was blended in a Waring Blender and then washed on a filter with 15 liters of hot water. The filter cake was then reslurried in 10 liters of water containing 125 ml. $H_2SO_4$ (about pH 1). The filter cake was then washed with 15 liters of hot water adjusted to pH 3.0. This filter cake was slurried in water to obtain a slurry containing 15 percent $SiO_2$. The slurry was fed to a fluid energy mill using air at 800°F inlet temperature and about 140 p.s.i.g. as the deagglomerating media. An 8 inch jet pulverizer was used. The slurry was injected into the mill by means of air at 450°F and 150 p.s.i.g. The effluent silica was collected in bag collectors. This silica is a thickening grade silica, and is dried at 200° C and is characterized as follows:

| | | |
|---|---|---|
| (a) | Surface Area* | = 449 m²/gm. |
| (b) | Water Pore Volume | = 2.4 cc/gm. |
| (c) | Aggregate particle size by microscope | = 0.2–0.5 microns |
| (d) | Primary particle size by electron microscope | = 50–75 millimicrons |
| (e) | Bulk Density | = 0.06 gm./cc |

*(The surface area is determined by the Brunauer-Emmet-Teller Test.

This silica was tested as a thickening agent with the following results:

| Thickening of Mineral oil with | Viscosity Measured on Brookfield LV Model at 3 RM using spindle 2 |
|---|---|
| 2% - $SiO_2$ | 2250 cps. |
| 3% - $SiO_2$ | 4500 cps. |
| 4% - $SiO_2$ | greater than 10,000 cps. |

EXAMPLE 2

Example 1 was repeated, using steam (at 1410°F and at 110 p.s.i.g.) in place of air in the fluid energy mill.

EXAMPLE 3

616 gm. of aqueous acid solution containing 35 percent $H_2SO_4$ (may contain 0.07 percent gelatin) was added with mixing to 3330 gms. of aqueous sodium silicate solution containing 12 percent $SiO_2$, 3.7 percent $Na_2O$ and 5.79 percent $NH_3$. The temperature was maintained at about 25°C. The resulting silica hydrosol set to a silica hydrogel in 3–6 minutes. A sulfuric acid solution was then added slowly to neutralize the silica. The resultant slurry has a 10 percent $SiO_2$ concentration. The slurry was filtered and washed with 6 liters of hot water. The filter cake was reslurried in 4 liters of hot water containing 50 ml. of 97 percent $H_2SO_4$. This slurry was again filtered. The filter cake was washed with 6 liters of hot water, followed by 12 liters of a hot pH 3.0 $H_2SO_4$ solution. This was followed by a second hot water wash. The washed filter cakes were then slurried in water to a concentration of about 15 percent $SiO_2$ and fed to the 8 inch micronizer jet pulverizer using 150 p.s.i. air at approximately 700°F. The micronized silica was collected and was tested as a thickening agent after drying at approximately 200°C.

The properties and thickening results were:

| | |
|---|---|
| Surface Area | = 313 m²/gm |
| Water Pore Volume | = 2.2 cc/gm |
| Aggregate Particle Size by microscope | = 0.25–0.75 micron |
| Primary Particle Size by | 30–40 millimicrons |

-continued electron microscope = (very loose aggregate)

Thickening of NUJOL mineral oil (extra heavy), a mineral oil of Plough, Inc, using 3 percent silica, blended in a Premier Dispensator and then deaerated gave viscosity readings on Brookfield RVF model at 2 RPM of 20,500 cps. and at 20 RPM of 3470 cps., indicating good thickening at low RPM and good flow at high RPM.

EXAMPLE 4

416 gm. of aqueous acidic solution containing 24 percent $H_2SO_4$ was added to 2330 gm. of an aqueous solution of sodium silicate containing 8.5 percent $SiO_2$, 2.6 percent $Na_2O$ and 4.2 percent $NH_3$. The silica concentration in the hydrosol was 7.3 percent $SiO_2$. The pH of the silica hydrosol was about 10.9 and it set to a hydrogel in 4–6 minutes. An $H_2SO_4$ solution was then added solely to completely neutralize the silica. Agitation was used during the additions, and the temperature of the slurry was continuously about 25°C. Additional water (about 500 cc) was added in order to reduce the viscosity during stirring. The slurry was filtered and rinsed with water. The filter cake was reslurried in 2000 ml of $H_2O$ containing 120 ml $H_2SO_4$ (97 percent). The slurry was filtered again and washed with hot water. The filter case was reslurried and 20 ml $H_2SO_4$ was added (pH 1.5). The slurry was filtered again and washed with 10 liters hot $H_2SO_4$ treated water. The filter cake was put into an excess of acetone for dewatering and filtered, followed by air drying. The filter cake was then fed to a 4 inch micronizer jet pulverizer using ambient temperature air. The silica was collected in bag collectors, further dried and evaluated. The properties and thickening results were:

| | |
|---|---|
| Surface Area | = 403 m²/gm |
| Water Pore Volume | = 2.6 cc/gm |
| Aggregate Particle Size by microscope | = 0.25–1.0 micron |
| Primary Particle Size | = 25–35 millimicrons |
| Bulk Density | = .040 g/cc |

Thickening of mineral oil NUJOL (extra heavy grade) at 25°C with 3 percent silica mixed in a Waring Blender gives viscosity readings on a Brookfield RVF model at 2 RPM of 31,000 cps. and at 20 RPM of 4000 cps. This indicates good thickening at low RPMs and good flow properties at 20 RPM

EXAMPLE 5

This example sets out a procedure for producing a flatting grade silica.

A solution containing 1072 g. 40°Be sodium silicate, 172 g. of a 29 percent ammonium hydroxide solution and 1756 g. of water were thoroughly mixed to form a 3000 g. total solution. This solution contains 300 g. silica and 50 g. ammonia. This yielded a silica concentration of 10 percent and silica/ammonia ratio of 6. Carbon dioxide was bubbled into this solution, reducing the pH to 10.91. This hydrosol gels in 4–6 minutes. This silica hydrogel was aged for 10 minutes without agitation and 50 minutes with agitation. Carbon dioxide was added over a period of about 1 hour until the pH reaches 9.0. Then sulfuric acid was added to neutralize the soda from the sodium silicate solution. This solution was then aged at 60°C for 16 hours. This material was dried and has the following characteristics:

| | |
|---|---|
| Total Volatiles at 1750°F | — 7.0 % |
| $Na_2O$ - (D.B.) | — 0.03% |
| $SO_4$ - (D.B.) | — 0.02% |
| Surface Area | — 400 m²/g |
| Pore Volume | — 2.4 cc/g |

The dried silica was fed to an 8 inch jet pulverizer fluid energy mill using air at 800°F inlet temperature and 140 p.s.i.g. The silica injection pressure was 150 p.s.i.g. The effluent silica was collected in a bag collector system. The resulting silica had an average particle size of 7 microns and was a good flatting agent for lacquers and varnishes.

EXAMPLE 6

The procedure of Example 5 was repeated except that the first solution had a silica concentration of 6 percent and a silica/ammonia ratio of 4. The final characteristics were:

| | |
|---|---|
| Total Volatility (1750°F) | — 7.0% |
| $Na_2O$ - (D.B.) | — 0.1% |
| $SO_4$ - (D.B.) | — 0.2% |
| Surface Area | — 170 m²/g |
| Pore Volume | — 1.3 cc/g |

EXAMPLES 7–21

This series of examples illustrate the result of varying the silicate concentration (percent silica) and the silica/ammonia ratio. These silica gels were carbon dioxide gelled following the procedure of Example 5. Table II illustrates the results achieved by varying the above reaction parameters. These silica materials may be used for thickening or flatting applications.

Table II

| Examples | $SiO_2$ % | $SiO_2/NH_3$ Ratio | pH of Gelation | Aging Temp. °C | Water Pore Volume ml/g. | Surface Area m²/g |
|---|---|---|---|---|---|---|
| 7 | 9 | 6 | 10.91 | 63 | 2.60 | 300 |
| 8 | 9 | 9 | 10.80 | 66 | 2.42 | 450 |
| 9 | 9 | 12 | 10.60 | 61 | 2.45 | 455 |
| 10 | 11 | 6 | 11.05 | 62 | 2.25 | 370 |
| 11 | 11 | 9 | 10.92 | 61 | 2.60 | 367 |
| 12 | 11 | 12 | 10.90 | 61 | 2.60 | 225 |
| 13 | 13 | 6 | 10.98 | 61 | 1.20 | 392 |
| 14 | 13 | 9 | 10.85 | 64 | 1.37 | 417 |
| 15 | 13 | 12 | 10.80 | 60 | 1.50 | 475 |
| 16 | 6 | 3 | 10.75 | 60 | 1.57 | 230 |
| 17 | 6 | 2 | 10.72 | 60 | 1.62 | 420 |
| 18 | 5 | 2 | 10.72 | 60 | 1.25 | 431 |
| 19 | 7 | 3 | 10.90 | 60 | 2.62 | 408 |

Table II-continued

| Examples | SiO₂ % | SiO₂/NH₃ Ratio | pH of Gelation | Aging Temp. °C | Water Pore Volume ml/g. | Surface Area m²/g |
|---|---|---|---|---|---|---|
| 20 | 7 | 3 | 10.90 | 60 | 2.50 | 461 |
| 21 | 7.5 | 3 | 10.90 | 60 | 2.85 | 451 |

EXAMPLES 22–28

This series of examples illustrates the result of varying the sodium silicate concentration (percent silica) and the silica/sodium sulfate desolubilizing agent ratio. The procedure of Example 5 was followed, with the pH being reduced to about 10.90 by the addition of either carbon dioxide or sulfuric acid as set out in Table III. At this pH, a silica hydrosol was formed on standing for 3–6 minutes converted to a silica hydrogel.

Table III

| Example | SiO₂ % | SiO₂/Na₂SO₄ Ratio | Gelation Acid | Water Pore Volume ml/g | Surface Area |
|---|---|---|---|---|---|
| 22 | 8 | 3 | CO₂ | 2.50 | 572 |
| 23 | 9 | 3 | CO₂ | 2.70 | 570 |
| 24 | 9 | 6 | CO₂ | 2.26 | 582 |
| 25 | 10 | 6 | CO₂ | 2.50 | 586 |
| 26 | 11 | 6 | CO₂ | 2.35 | — |
| 27 | 9 | 6 | H₂SO₄ | 2.20 | 584 |
| 28 | 8.5 | 3 | H₂SO₄ | 2.50 | 615 |

What is claimed is:

1. The method of selectively producing a high pore volume silica gel comprising:
   a. forming a first aqueous solution having a definite alkali metal silicate concentration and a water soluble silica desolubilizing agent concentration, said silica desolubilizing agent functioning to decrease the solubility of silica in water and being selected from the group consisting of ammonia, monohydric alcohols, glycols, ketones and salts;
   b. adding an acid so as to reduce the pH to about 11.2 to 10.6 thereby forming a silica hydrosol;
   c. allowing said silica hydrosol to set to a silica hydrogel;
   d. aging said silica hydrogel for about 2 to 120 minutes;
   e. neutralizing said silica hydrogel by adding an acid to reduce the pH to a pH of about 10 to 3; and
   f. washing and recovering the high pore volume silica gel product.

2. The method of claim 1 wherein after neutralizing and prior to washing said silica hydrogel is further aged for 0.1 to 24 hours at 20° to 95°C.

3. The method of claim 1 wherein the silicate concentration in said first solution is in the range of from about 3 to 15 percent calculated as silica, said desolubilizing agent being in a concentration to yield a silica to desolubilizing agent ratio to about 2 to 20.

4. The method of claim 3 wherein said desolubilizing agent is selected from the group consisting of sodium sulfate and ammonia producing a silica gel product having a pore volume of from about 1.2 to 3.0 cc/g.

5. The method of claim 4 wherein the said silica hydrosol is formed using an acid selected from the group consisting of sulfuric acid, hydrochloric acid, sulfurous oxide and carbon dioxide.

6. The method of claim 5 wherein said silica hydrogel is neutralized using an acid selected from the group consisting of sulfuric acid, hydrochloric acid, sulfurous oxide and carbon dioxide.

7. The method of claim 6 wherein before neutralizing, said silica hydrogel is aged for 40 minutes to 120 minutes at a temperature of about 15°C to 95°C.

8. The method of Claim 3 wherein said silica hydrosol is formed and silica hydrogel is neutralized using an acid selected from the group consisting of sulfuric acid, hydrochloric acid, sulfurous oxide and carbon dioxide.

9. The method of claim 8 wherein said silicate is sodium silicate, said desolubilizing agent is ammonia, the silica hydrosol forming acid is carbon dioxide and the neutralizing acid is selected from the group consisting of sulfuric acid and carbon dioxide.

10. The method of claim 9 wherein said neutralizing acid is carbon dioxide.

11. The method of claim 9 wherein said neutralizing acid is sulfuric acid.

12. The method of claim 8 wherein said silicate is sodium silicate, said desolubilizing agent is sodium sulfate, the silica hydrosol forming acid is carbon dioxide, and the neutralizing acid is selected from the group consisting of sulfuric acid and carbon dioxide.

13. The method of claim 12 wherein said neutralizing acid is carbon dioxide.

14. The method of claim 12 wherein said neutralizing acid is sulfuric acid.

15. The method of claim 2 wherein said desolubilizing agent is selected from the group consisting of sodium sulfate and ammonia producing a silica gel product having a pore volume of from about 1.2 to 3.0 cc/g.

16. The method of claim 15 wherein the alkali silicate concentration in said first solution is in the range of from about 3 to 15 percent calculated as silica, said desolubilizing agent being in a concentration to yield a silica to desolubilizing agent ratio of about 2 to 20.

17. The method of claim 16 wherein said silica hydrosol is formed using an acid selected from the group consisting of sulfuric acid, hydrochloric acid, sulfurous oxide and carbon dioxide.

18. The method of claim 17 wherein said silica hydrogel is neutralized using an acid selected from the group consisting of sulfuric acid, hydrochloric acid, sulfurous oxide and carbon dioxide.

19. The method of claim 18 wherein said silicate is sodium silicate, said desolubilizing agent is ammonia, the silica hydrosol forming acid is carbon dioxide, and the neutralizing acid is selected from the group consisting of sulfuric acid and carbon dioxide.

20. The method of claim 19 wherein said neutralizing acid is carbon dioxide.

21. The method of claim 19 wherein said neutralizing acid is sulfuric acid.

22. The method of claim 18 wherein before neutralizing, said silica hydrogel is aged for from 40 to 120 minutes at a temperature of about 20°C to 95°C.

23. The method of claim 18 wherein said silicate is sodium silicate, said desolubilizing agent is sodium sulfate, the silica hydrosol forming acid is carbon dioxide and the neutralizing acid is selected from the group consisting of sulfuric acid and carbon dioxide.

24. The method of claim 23 wherein said neutralizing acid is sulfuric acid.

25. The method of claim 23 wherein before neutralizing, said silica hydrogel is aged for from 40 to 120 minutes at a temperature of about 20°C to 95°C.

* * * * *